United States Patent [19]

Moris

[11] 4,394,989
[45] Jul. 26, 1983

[54] ADJUSTABLE ENDLESS LOOP TAPE CARTRIDGE WITH SHIPPING LOCK

[75] Inventor: Alfred H. Moris, St. Paul, Minn.

[73] Assignee: Minnesota Mining and Manufacturing Company, St. Paul, Minn.

[21] Appl. No.: 259,184

[22] Filed: Apr. 30, 1981

[51] Int. Cl.³ .............................................. G11B 23/10
[52] U.S. Cl. .......................... 242/55.19 A; 352/78 R; 360/93
[58] Field of Search ................. 242/55.19 A, 55.19 R, 242/198; 360/93, 94; 352/72, 78

[56] References Cited
U.S. PATENT DOCUMENTS

| 3,250,481 | 5/1966 | Seki | 242/198 |
|---|---|---|---|
| 3,257,084 | 6/1966 | Cole, Jr. | 242/55.19 A |
| 3,468,490 | 9/1969 | Knox | 242/55.19 A |
| 3,524,602 | 8/1970 | Greene | 242/55.19 A |
| 3,637,151 | 1/1972 | Skwarek et al. | 242/55.19 A |
| 3,756,525 | 9/1973 | Aoki | 242/55.19 A |
| 3,773,272 | 11/1973 | Wallace | 242/55.19 A |
| 3,913,857 | 10/1975 | Threlkeld | 242/55.19 A |
| 3,967,788 | 7/1976 | Ponce | 242/55.19 A |
| 4,054,925 | 10/1977 | Towner et al. | 242/55.19 R |

FOREIGN PATENT DOCUMENTS 775532  5/1957  United Kingdom .
1416743 12/1975 United Kingdom .

Primary Examiner—Billy S. Taylor
Attorney, Agent, or Firm—Cruzan Alexander; Donald M. Sell; William L. Huebsch

[57] ABSTRACT

A cartridge including a cylindrical hub attached to a housing, which hub has a central opening and a slot extending axially across the width of the hub and communicating with the central opening, and an endless length of magnetic tape having a major portion wrapped about the hub to form a coil and a minor portion extending from the innermost wrap of the coil, through the slot and around the side surface of the coil to the outermost wrap of the coil. Means on the housing define a tape path for the minor tape portion including a spring biased movable guide pin that provides a desired low, predetermined tension in the outermost wrap of the coil. A portion of the hub can be moved radially to adjust the length of the minor tape portion and thereby position the guide pin in a predetermined portion of its range of movement, and a lock assembly is provided for restricting movement of tape in the coil during shipping, which lock assembly is automatically released when the cartridge is inserted into a machine.

4 Claims, 5 Drawing Figures

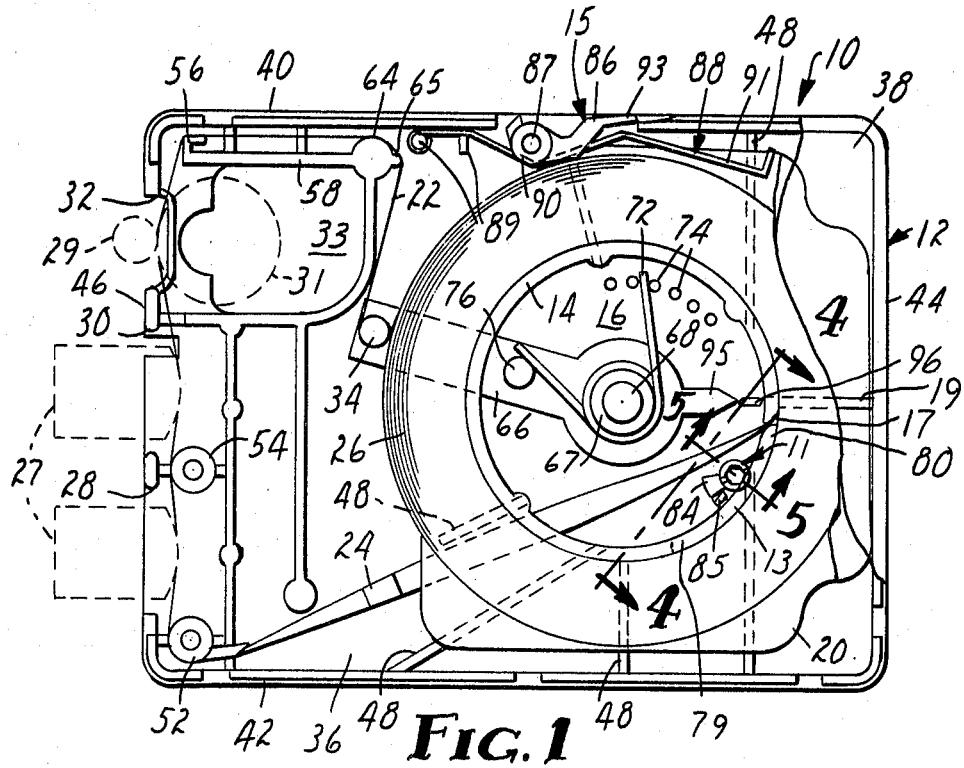
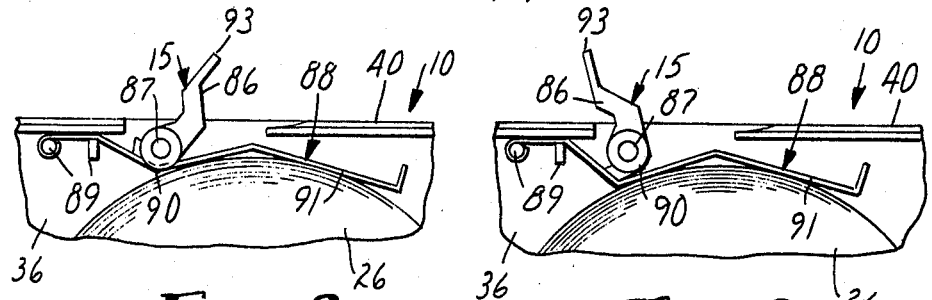
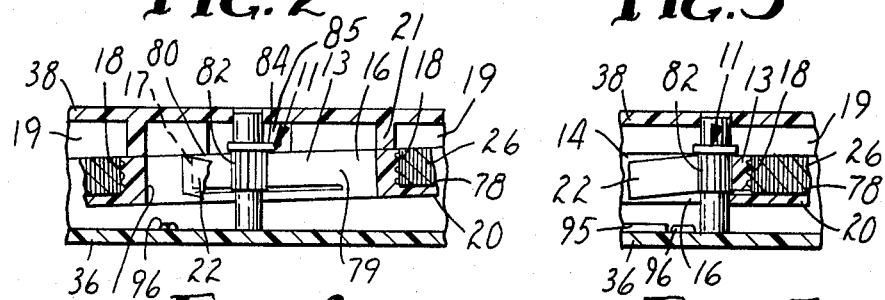

ADJUSTABLE ENDLESS LOOP TAPE CARTRIDGE WITH SHIPPING LOCK

TECHNICAL FIELD

The present invention relates to cartridges for use in magnetic recording and/or playback machines, which cartridges each include a length of magnetizable tape that is spliced into an endless loop; and in one important aspect to such cartridges used in the radio broadcasting industry.

BACKGROUND ART

My U.S. patent application Ser. No. 214,042 describes a cartridge including a length of magnetic tape spliced into an endless loop. In one embodiment that cartridge can be made to conform to the standard of the NAB so that it can be used in the types of record/playback machines presently in use in the broadcast industry. That cartridge embodiment causes much less edge wear on the tape and much less change in tension in the tape at a head of a machine in which the cartridge is received than the other types of cartridges presently in use in the broadcast industry.

The cartridge described in patent application Ser. No. 214,042 employs a method for maintaining a uniform high tension in the tape at a head of a machine in which the cartridge is engaged so that the tape can be pressed against the head via the tension alone without the use of pressure pads. That method comprises providing a fixed, generally cylindrical hub having a central opening and a slot extending axially across the full width of the hub and communicating with its central opening, and an endless length of magnetic tape; wrapping a major portion of the tape about the hub to form a coil while allowing a minor portion of the tape to extend from the innermost wrap of the coil through the slot into the central opening of the hub, and around the side surface of the coil to the outermost wrap of the coil; pulling the tape from the slot and across a head on a record/playback machine; and applying a light force to tension the minor portion of the tape as it moves onto the outer wrap of the coil which will produce the high, generally uniform tension in the minor portion of the tape being pulled from the coil and across the head.

The embodiment of the cartridge adapted for use in the broadcast industry which employs that method to tension tape across a head comprises a housing adapted to be received in a record/playback machine and having access openings adapted to receive record/playback heads and a tape drive mechanism in the machine. The hub is fixed on the housing at a position spaced from the access openings. Means on the housing define a tape path for, and produce tension in, the minor portion of the tape. Those means comprise means for guiding the minor portion of the tape past the access openings in a predetermined position for engagement by the heads and the drive mechanism of the playback machine, and a guide pin guiding the minor portion of the tape between the access openings and the outermost wrap of the coil. The guide pin is mounted for movement between a first position providing a first path length between the access openings and the outer wrap of the coil and a second position providing a second path length longer than the first path length between the access openings and the outer wrap of the coil (which means preferably is an arm having a first end supporting the guide pin, and a second end pivotably mounted on the housing to afford movement of the pin along an arcuate path adjacent the periphery of the coil between its first and second positions), and means are provided for biasing the guide pin toward its second position.

The pin can move to positions between its first and second positions under the influence of the biasing means to accommodate changes in length of the minor portion of the tape which decreases or increases respectively when the length of the major portion increases or decreases. The major portion of the tape cyclically undergoes its largest change in length by slowly decreasing in length as the splice moves from the coils outer wrap toward its inner wrap and by then suddenly increasing in length as the splice leaves the coil. The means for biasing the guide pin is adapted to apply a small force at the guide pin (e.g. generally in the range of 2 to 14 grams) to lightly tension the tape extending around the pin and moving onto the outermost wrap of the coil, somewhat in the manner of a rope or Proney brake, which light tension produces a significantly higher tension (e.g., generally in the range of 50 to 115 grams or 2 to 4 ounces) in tape leaving the coil. That higher tension is surprisingly uniform (e.g., plus or minus 7 grams or ¼ ounce) despite small changes in the force applied by the guide pin (e.g., plus or minus 1½ grams) as the length of the minor portion of the tape changes due to the position of the splice along the tape.

The tape is guided so that the quite uniform higher tension thus produced in the minor portion of the tape between the inner wrap of the coil and the drive mechanism of a machine in which the cartridge is engaged presses the tape against the record and playback heads of the machine with sufficient pressure that pressure pads are not required, and the tape is thus not subjected to the abrasion and erratic forces caused by sliding contact between the tape and such pressure pads.

While, as described in my U.S. patent application Ser. No. 214,042, the range of movement of the pin can accommodate most changes in length of the minor portion of the tape caused by wear on the tape in the coil or other factors, such accommodation does not produce regulation of the forces applied in the tape with the degree of precision that might otherwise be desired.

Also, the tape in the tape cartridge described in my application Ser. No. 214,042 can become displaced during rough handling, such as can occur during shipment of the cartridge between locations, which displacement can cause problems upon subsequent initial usage of the cartridge.

DISCLOSURE OF THE INVENTION

The present invention provides a tape cartridge of the type described above in which the length of the minor portion of the tape can be easily adjusted by persons in the field to accommodate changes in the cartridge such as tape wear to ensure that a desired range of guide pin movement will be retained; and which affords holding the tape in proper locations within the cartridge when it is expected to receive rough handling, such as when it is shipped between locations.

According to the present invention there is provided a cartridge of the aforementioned type comprising a housing adapted to be received in a machine; a cylindrical hub attached to the housing which has a central opening and a slot extending axially across the full width of the hub and communicating with the central opening; and an endless length of tape having a major portion wrapped about the hub to form a coil and a minor portion extending from the innermost wrap of the coil through the slot into the central opening, and around the side surface of the coil to the outermost wrap of the coil. Means are provided on the housing for defining a tape path for and producing tension in the minor portion including a guide pin guiding the minor portion, means mounting the guide pin for movement between a first position providing a first path length for the minor portion and a second position providing a second path length longer than said first path length for the minor portion, and means for biasing the guide pin toward its second position with a low force to provide a low tension in the outermost wrap of the coil. In the improved cartridge, the hub comprises a flexible arcuate cantilevered portion having a first end partially defining the slot, a second end that is fixed on the housing, and which is separated from the housing between its ends. Means are provided for changing the position of the cantilevered hub portion radially of the rest of the hub to adjust the length of the minor portion of the tape and thereby cause the guide pin to move within a desired range of movement between its first and second positions.

Preferably the means for changing the position of the arcuate cantilevered hub portion is provided by a cam rotatably mounted on the housing, which cam has a peripheral surface contacting the inner side of the cantilevered hub portion, and which can be rotated via a tool such as a screwdriver as the tape is being propelled by a machine so that the effects of cam adjustments on the tape can be observed as they are made.

Such adjustability ensures that changes in overall tape length which can occur due to causes such as tape wear can be compensated for.

It is anticipated that such adjustments will not need to be made often during the life of a cartridge, but perhaps could advantageously be made by technicians each time the tape is re-recorded.

Additionally the improved cartridge according to the present invention includes a lock assembly mounted on the housing for movement between a release portion with the lock assembly entirely enclosed within the housing and spaced from the tape, and a lock position at which a first portion of the lock assembly engages the tape coil and a second portion of the lock assembly projects from the housing. The lock assembly can be moved to its release position or its lock position by manual engagement of its second portion. Also preferably detent means are provided to bias the lock assembly to its release position when the lock assembly its adjacent it, and when the lock assembly is in its lock position its second portion is positioned so that a machine into which the cartridge is inserted will engage and move the second portion of the lock assembly to adjacent its release position from whence the detent means will move the lock assembly to its release position. Thus the machine cannot attempt to move the tape while the tape is being held by the lock assembly.

BRIEF DESCRIPTION OF THE DRAWING

The invention will be further described with reference to the accompanying drawing wherein like numbers refer to like parts in the several views, and wherein:

FIG. 1 is a horizontal plan view of a tape cartridge according to the present invention having parts broken away to show details;

FIGS. 2 and 3 are fragmentary views showing two different lock positions of a locking assembly in the tape cartridge of FIG. 1;

FIGS. 4 and 5 are sectional views taken approximately along lines 4—4 and 5—5 of FIG. 1, respectively.

DETAILED DESCRIPTION

Figure 6:
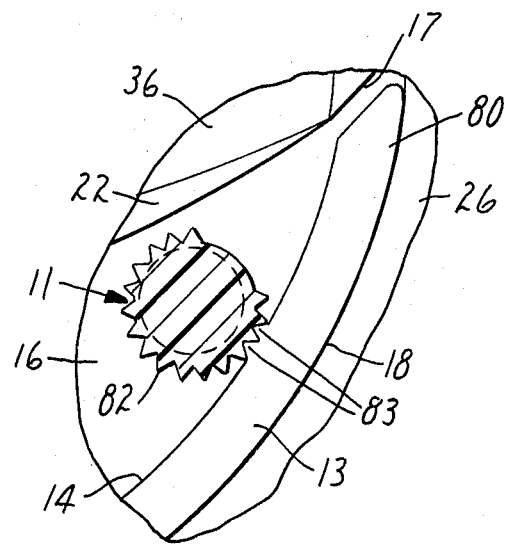
FIG. 6 is an enlarged fragmentary sectional view of an adjustment member or cam in the cartridge of FIG. 1.

Referring now to the drawing there is shown a cartridge 10 according to the present invention. Except for the addition of structure in the cartridge 10 comprising (1) a cantilevered portion 13 of a hub 14 and an adjustment member or cam 11 for adjusting the location of the cantilevered portion 13 radially of the rest of the hub 14 that affords adjusting the length of a minor portion of an endless loop of strip material or magnetizable tape 22 extending between the inner and outer wrap of a coil 26 of the tape 22 on the hub 14, and (2) a lock assembly 15 that allows tape 22 in the cartridge 10 to be locked in place (such as during shipment), the cartridge 10 has essentially the same structure as the cartridge described in my U.S. patent application Ser. No. 214,042 (the content whereof is incorporated herein by reference), and the same reference numerals have been used herein to identify structures that are similar to structures in that application.

Like the cartridge 10 described in that application, the cartridge 10 includes a two-piece molded housing 12, the annular hub 14 which is fixed in the housing 12 and has a central opening 16 and a slot 17 communicating between the central opening 16 and a peripheral surface of the hub 14 defined by annular, axially spaced ribs 18, and a bottom flange 20 extending radially outwardly from one edge of the hub 14.

Unlike the cartridge 10 described in that application, however, the cartridge 10 has no upper flange for the hub 14, but provides the function of such an upper flange by including a plurality of ridges 19 oriented radially of the hub 14 and joined at their inner ends by an annular ridge 21, which ridges 19 and 21 depend from and are integrally molded with a top wall 38 of the housing 12.

The endless loop of tape 22 has a major portion wound in the coil 26 about the hub 14, and a minor portion extending from the innermost wrap of the coil 26 through the slot 17, and along means for defining a tape path for the minor portion of the tape past access openings 28, 30, 32, and 33 in the cartridge housing 12 (which access openings 28, 30, 32 and 33 are adapted to receive heads 27 and a capstan 29 and a pinch roller 31 of a tape machine drive mechanism shown in dotted outline in FIG. 1) around a movable guide pin 34 to the outermost wrap of the coil 26, which guide pin 34 is also included in means for producing tension in the minor portion of the tape 22 as it is moved through the cartridge 10, as will later be explained.

The two-piece housing 12 is generally rectangular and comprises a bottom wall 36 in which the access opening 33 is formed, the top wall 38 which is transparent, opposite side walls 40 and 42, a rear wall 44 and a front wall 46 in which the access openings 28, 30 and 32 are formed. The outer shape of the housing 12, the positioning and shape of the access openings 28, 30, 32 and 33, and the location of the tape path past the access openings 28, 30, 32 and 33 are all in accordance with the "NAB Standard, Cartridge Tape Recording and Reproducing" which is published by the National Association of Broadcasters, 1771 N Street N.W., Washington, D.C. 20036, the content whereof is incorporated herein by reference.

The means for defining the tape path for the tape 22 past the access openings 28, 30, 32 and 33 comprises bosses 48 projecting from the inner surface of the bottom wall 36. The bosses 48 fixedly support the hub 14 and bottom flange 20 and space the bottom flange 20 from the bottom wall 36 so that tape 22 exiting from the slot 17 will twist about 90 degrees as it passes across the opening 16, will pass with one of its major surfaces against the outer surface of the lower flange 20 between the bottom flange 20 and the bottom wall 36, and will then twist back to its original orientation and pass onto a projecting portion of a guide 52 and around a generally cylindrical portion of the guide 52. The guide 52 is fixed on and projects from the bottom wall 36 of the housing 12, and has concave side surfaces facing the side and front walls 42 and 46, around which side surfaces the tape changes direction to move parallel to the front wall 46 and across the openings 28, 30 and 32. A second generally cylindrical guide 54 is fixed on and projects from the bottom wall 36 and also has a concave surface facing the front wall 46. The guides 54 and 52 position the tape at a predetermined position axially along the guides 52 and 54 between the top and bottom walls 38 and 36 and with respect to the openings 28, 30 and 32 (and thereby along heads 27 positioned in the openings 28 and 30) by centering the tape across their concave side surfaces, which centering effect is known in the art. An upstanding arcuate wall 56 guides the tape through a 90-degree arc along the side wall 40 in a channel between the side wall 40 and a portion 58 of an adjacent wall which surrounds the access opening 33 in the bottom wall 36, and around wall edge surfaces 64 and 65 at the end of the wall portion 58 opposite the front wall 46. From the wall edge surface 65 the tape extends around the movable guide pin 34 included in the means for providing tension in the minor portion of the tape 22.

The means for maintaining tension in the minor portion of the tape 22 comprises the movable guide pin 34, and means mounting the guide pin 34 for movement provided by an arm 66 having one end on which the guide pin 34 is fixed, and an opposite end having a hollow cylindrical projecting collar 67 journaled about a cylindrical projection 68 from the bottom wall 36 located approximately co-axially with the the hub 14. Pivotal movement of the arm 66 allows the guide pin 34 to move along the periphery of the coil 26 between (1) a first position providing a first path length between the access openings 28, 30, 32 and 33 and the periphery of the coil 26 (which first position is defined by engagement of the arm 66 against one of the bosses 48 adjacent the side wall 40); and (2) a second position providing a second path length longer than the first path length between the access openings 28, 30, 32 and 33 and the coil 26 defined by engagement of the guide pin 34 with one of the bosses 48 adjacent the side wall 42. A spring 72 is coiled around the collar 67 and has a first end supported against one lug in an arcuate row of lugs 74 projecting from the bottom wall 36, and an opposite second end engaged against a lug 76 on the arm 66 to provide adjustable means for biasing the movable guide pin 34 towards its second position. The spring 72 is long so that it provides a low force (e.g., in the range of about 2 to 14 grams measured at the pin 34) to press the guide pin 34 against the tape 22 over the relatively small range of movement of the guide pin 34, and the selection of different lugs from the row of lugs 74 allows some adjustment to be made in that force level by engaging the first end of the spring 72 with a selected one of the lugs 74.

As is taught in U.S. patent application Ser. No. 23,302, the ribs 18 defining the periphery of the hub 14 restrict the force required to pull the tape 22 from the innermost wrap of the coil 26 by not only reducing friction between the fixed hub 14 and the innermost wrap on the coil 26, but also reducing friction between all the wraps of the coil 26 which must slide relative to each other as the coil 26 rotates. Also, the radius of the generally cylindrical hub 14 at its periphery defined by the ribs 18 preferably decreases slightly (e.g., by about 0.05 cm for a hub 14 with about a 2.7 cm average radius) around the hub 14 in the direction the coil 26 rotates from an edge of the slot defined by a first end 80 of the cantilevered portion 13 of the hub 14 to a radiused edge of the slot 17 over which the inner wrap of tape bends as it exits the coil 26, which decreasing radius surprisingly decreases surging in the tension caused by the wraps of the tape 22 in the coil 26 moving relative to each other.

A graphite lubricated polymeric sheet 78, which may be made from the same material as the tape 22, can be positioned between the bottom flange 20 and the lower side surface of the coil 26. This sheet 78 appears to restrict cinching of the wraps of the tape 22 in the coil 26 about the hub 14 during rapid acceleration of the coil 26, apparently by providing a measure of tracking engagement with the edges of the wraps of tape in the coil to retain their original diameter during such acceleration.

The structure in the cartridge 10, including the arcuate cantilevered portion 13 of the hub 14 and the adjustment member or cam 11 which allows adjustment of the minor tape length between the outermost and innermost wrap of the tape in the coil 26 is best seen in FIGS. 1, 4 and 5. The cantilevered portion 13 of the hub 14 has a second end 79 that is fixed on the housing 12 opposite its first end 80 that defines one side of the slot 17. The cantilevered hub portion 13 is separated from the housing 12 between its first and second ends 80 and 79, and is resiliently flexible. The cam 11 has a peripheral surface which contacts the inner surface of the cantilevered hub portion 13, and which has portions at progressively increasing distances from the axis about which the cam 11 is rotatable, and thus can be rotated to move the cantilevered hub portion 13 outward or allow it to retract radially of the hub 14 to adjust the diameter of the coil 26 adjacent the cam 11. Because of the multiplying effect of the many wraps of tape in the coil 26, even small movements of the cantilevered hub portion 13 will make significant changes in the minor length of the tape (e.g., for about 86 meters or 282 feet of tape wrapped about 392 times in the coil 26, an outward movement of 0.076 mm or 0.003 inch of the cantilevered hub portion 13 at the cam 11 will cause a change of about 25.4 mm or 1 inch in the length of the minor tape portion). The end of the cam 11 at the top wall 38 has both a slot adapted to receive a screwdriver blade and a socket adopted to receive an allen wrench, either of which tools can be engaged with the cam through an opening in the top wall 38 into which the end of the cam 11 projects. The periphery of the cam 11 has axially extending spaced ribs 82 which mate with corresponding parallel ribs 83 on the cantilevered hub portion 13 (see FIG. 6) to provide a detent that retains a set position of the cam 11. Rotation of the cam 11 is limited to less than 360 degrees (with the maximum and minimum diameters of the cam 11 adjacent the cantilevered hub portion 13 at opposite ends of the rotation) by a radial projection 84 on the cam 11 adapted to engage opposite ends of a block 85 depending from the top wall 38 at the opposite extremes of the cam's rotation.

The lock assembly 15 which allows the tape in the cartridge 10 to be locked in place comprises an arm 86 pivotably mounted on the housing 12 at a pin 87, and a cantilever spring 88. The spring 88 has one coiled end retained by projections 89 along the side wall 40, a portion adjacent the projections 89 biased against a cam portion 90 of the arm 86, and a distal end portion 91 positioned adjacent the outer wrap of the coil 26. Pivoting of the arm 86 moves the lock assembly 15 between (1) a release position (FIG. 1) at which a flat part of the arm's cam portion 90 adjacent the spring 88 allows the spring 88 to move to a position with its distal end portion 91 spaced from the coil 26 and a projecting portion 93 of the arm 86 is disposed within the periphery of the housing 12, at which release position the lock assembly 13 will not interfere with the movement of the tape 22 within the cartridge; and (2) a first lock position (FIG. 2) at which a flat part of the arm's cam portion 90 adjacent the spring 88 presses it to a position at which its distal end portion 91 is pressed against the outer wrap of tape 22 on the coil 26 and the projecting portion 93 of the arm 86 projects through an opening in the sidewall 40 and beyond the periphery of the housing 12. Engagement of the spring 88 with the flats on the cam portion 90 of the arm 86 provides detent means for biasing the lock assembly 15 to the one of its positions that it is adjacent.

The cam portion 90 of the arm 86 also has a third flat part that can be rotated into engagement with the spring 88 to provide a second lock position (FIG. 3) at which the distal end portion 91 of the spring 88 will be biased against a coil on the hub 14 of a lesser diameter than the diameter of the coil 26, which lesser diameter coil may result when less tape is supplied in the cartridge.

With either the first or second locking position of the lock assembly 15, however, the projecting portion 93 of the arm 86 will project from a portion of the housing 12 which must pass closely adjacent a part of a machine into which the cartridge 10 is inserted. Thus upon insertion of the cartridge 10 the projecting portion 93 of the arm 86 will engage the machine and will be moved into alignment with the side wall 40 of the cartridge 10, from whence the detent means will move the arm 86 to position the lock assembly 15 in its release position.

During use of the cartridge 10 on a record/broadcast machine, the capstan 29 and pinch roller 31 of the machine pull tape through the slot 17 in the hub 14 from the innermost wrap of the coil 26, and past the heads 27 on the machine which are positioned in the access openings 28 and 30. After leaving the nip between the capstan 29 and the pinch roller 31 tape moves in a generally U-shaped pattern from the edge wall surfaces 64 and 65 about 180 degrees around the movable pin 34 and onto the coil 26 as its outermost wrap. The spring 72 biases the movable pin to maintain a low tension in the length of tape 22 extending from the capstan 29 to the outermost wrap of the coil 26, which low tension results in a quite uniform higher tension in the tape leving the slot 17 and extending from the slot 17 past the heads to the capstan 29. As a splice 24 between ends of the tape 22 (which splice 24 is about as thick as the tape 22 itself) moves through the coil 26 from its outermost to its innermost wrap, the length of the major portion of the tape 22 in the coil 26 will increase slightly due to the increased diameter of each wrap in the coil 26 overlaying the splice 24. Such increase in length of the major portion of the tape 22 in the coil 26 will decrease the length of the minor portion of the tape along the path past the access openings 28, 30, 32 and 33 between the innermost and outermost wraps of the coil 26, which decrease will be accommodated for by movement of the arm 66 and pin 34 toward its first position against the bias of the spring 72. Movement of the arm 66 and pin 34 under the influence of the spring 72 will also maintain tension in the minor portion of the tape as its length decreases when the splice 24 leaves the innermost wrap of the coil 26, or as relatively thick portions of the tape 22 move into and out of radial alignment in the coil 26 as the wraps of tape in the coil move relative to each other.

Should wear of the tape 22 or other conditions within the cartridge 10 cause the range of movement of the arm 66 and pin 34 to change so that it produces an undesirably high or low tension in the tape 22, or so that the arm 66 contacts or is close to contacting one of the bosses 48 limiting its movement, the range of movement of the arm 66 can be easily adjusted while the cartridge 10 is inserted in a machine and the machine is moving the tape 22 in the cartridge 10. This adjustment is made by rotating the cam 11 via a screwdriver or allen wrench to increase or decrease the effective diameter of the hub 14. Selecting the proper range of movement for the arm 66 during such adjustment is facilitated by a pointer 95 projecting from the arm 66 and an indicating boss 96 on the bottom wall 38. The pointer 95 and boss 96 are in alignment when the arm 66 is in the center of its range of movement, and excursion of the pionter 95 on both sides of he boss 96 can be observed as the cam 14 is adjusted to obtain a proper adjustment.

What is claimed is:

1. In a cartridge comprising:
 a housing adapted to be received in a machine and having access openings adapted to receive heads and a tape drive mechanism in said machine;
 a cylindrical hub attached to said housing at a position spaced from said access openings, said hub having a central opening and a slot extending axially across the full width of the hub and communicating with said central opening;
 an endless length of tape having a major portion wrapped about said hub to form a coil and a minor portion extending from the innermost wrap of the coil through said slot into said central opening, and around the side surface of the coil to the outermost wrap of the coil; and
 means on said housing for defining a tape path for and producing tension in said minor portion, comprising means for guiding said minor portion past said access openings in a predetermined position for engagement by the heads and drive mechanism of the playback machine, a guide pin guiding said minor portion between said access openings and the outermost wrap of said coil, means mounting said guide pin for movement between a first position providing a first path length between said access openings and said coil and a second position providing a second path length longer than said first path length between said access openings and said coil, and means for biasing said guide pin toward said second position with a low force to provide a low tension in the outermost wrap of the coil, the improvement wherein:

said hub comprises a flexible cantilevered portion having a first end partially defining said slot, having a second end spaced from said first end that is fixed on said housing, and being separated from said housing between said first and second ends, and said cartridge comprises an adjustment member movably mounted on said housing and having a surface contacting said cantilevered hub portion, said adjustment member being movable to change the position of the surface contacting said cantilevered portion and thus change the position of said cantilevered portion radially of said hub to adjust the length of said minor portion and position said guide pin at a predetermined position between said first and second positions.

2. A cartridge according to claim 1 wherein the contacting surfaces of said adjustment member and said cantilevered hub portion are shaped to detent at various positions of said surface contacting said cantilevered hub portion.

3. In a cartridge comprising:
a housing adapted to be received in a machine and having access openings adapted to receive heads and a tape drive mechanism in said machine;
a cylindrical hub attached to said housing at a position spaced from said access openings, said hub having a central opening and a slot extending axially across the full width of the hub and communicating with said central opening;
an endless length of tape having a major portion wrapped about said hub to form a coil and a minor portion extending from the innermost wrap of the coil through said slot into said central opening, and around the side surface of the coil to the outermost wrap of the coil; and
means on said housing for defining a tape path for and producing tension in said minor portion, comprising means for guiding said minor portion past said access openings in a predetermined position for engagement by the heads and drive mechanism of the playback machine, a guide pin guiding said minor portion between said access openings and the outermost wrap of said coil, means mounting said guide pin for movement between a first position providing a first path length between said access openings and said coil and a second position providing a second path length longer than said first path length between said access openings and said coil, and means for biasing said guide pin toward said second position with a low force to provide a low tension in the outermost wrap of the coil, the improvement wherein:

said hub comprises a flexible cantilevered portion having a first end partially defining said slot, having a second end spaced from said first end that is fixed on said housing, and being separated from said housing between said first and second ends, and said cartridge comprises a cam rotatably mounted on said housing and having a peripheral surface contacting the inner side of said cantilevered hub portion, said cam being rotatable to change the position of said cantilevered portion radially of said hub and thereby adjust the length of said minor portion and position said guide pin at a predetermined position between said first and second positions.

4. A cartridge according to claim 3 wherein the contacting surfaces of said cam and said cantilevered hub portion are shaped to detent at various angular positions of said cam.

* * * * *